UNITED STATES PATENT OFFICE.

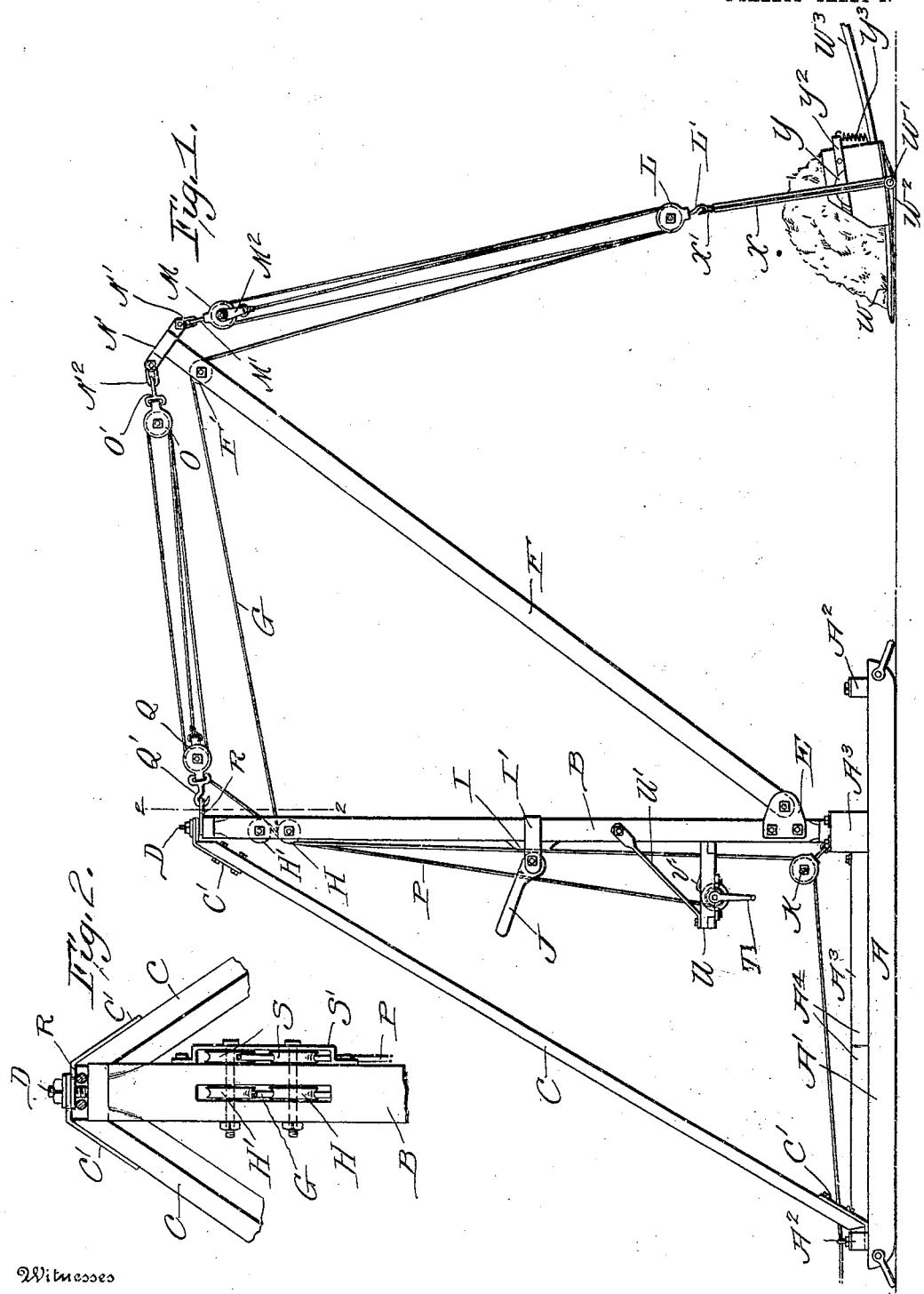

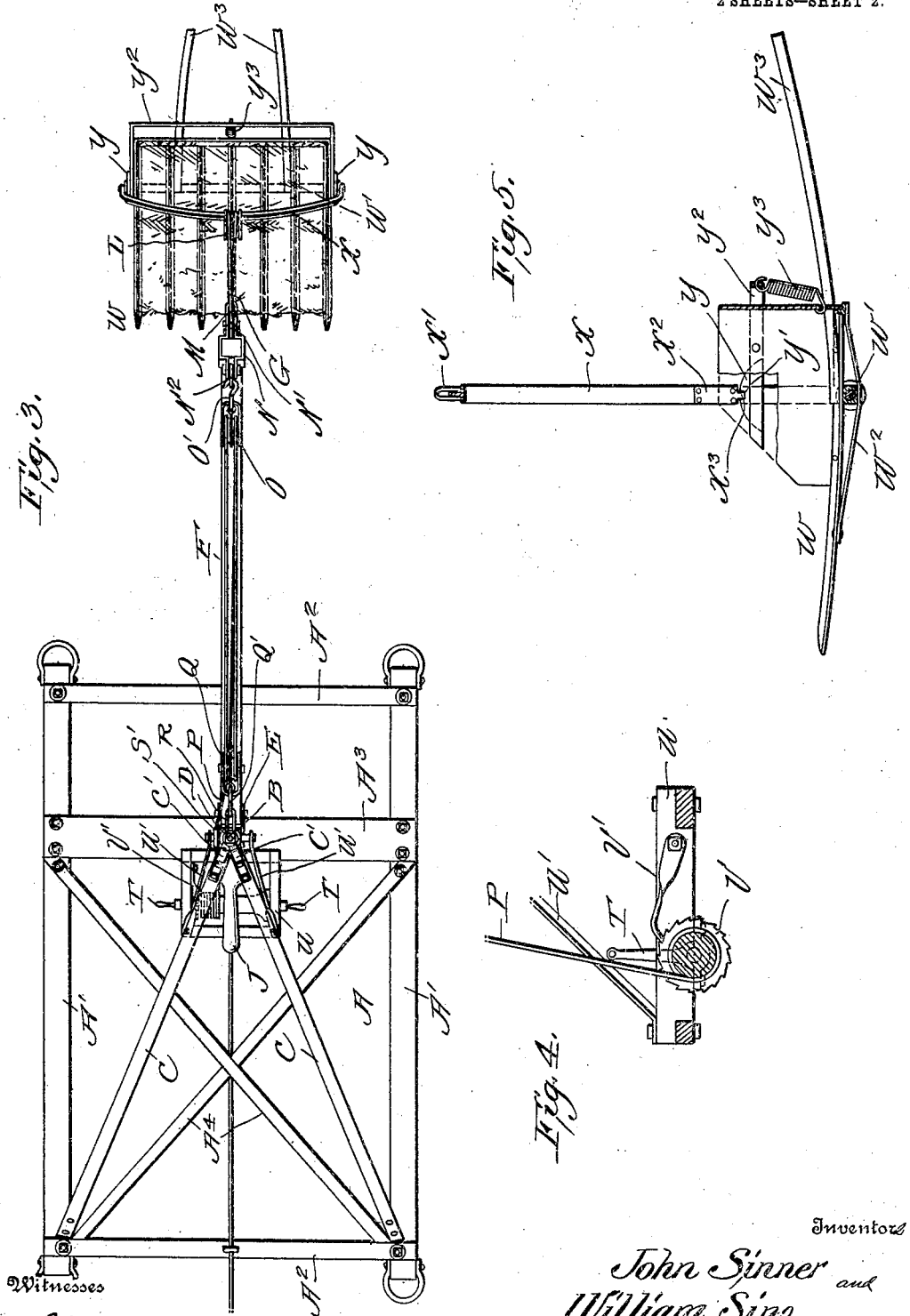

JOHN SINNER AND WILLIAM SINZ, OF CASSELTON, NORTH DAKOTA.

MANURE-LOADER.

954,545.  Specification of Letters Patent.  Patented Apr. 12, 1910.

Application filed May 17, 1909. Serial No. 496,410.

*To all whom it may concern:*

Be it known that we, JOHN SINNER and WILLIAM SINZ, citizens of the United States, residing at Casselton, in the county of Cass and State of North Dakota, have invented a new and useful Improvement in Manure-Loaders, of which the following is a specification.

This invention relates to manure loaders, the object being to provide a manure loader which is mounted upon a sled so that it can be readily dragged from place to place, whereby said loader can be placed in position with respect to the pile of manure to be loaded into a wagon.

Another object of our invention is to provide a manure loader which is so constructed that it can be readily taken apart whereby the same can be placed into a knockdown position for shipment.

A further object of the invention is to provide the loader with a fork which is so constructed that after it has gathered its load and is raised in position over the wagon, it can be released so as to dump its load within the wagon.

A still further object of our invention is to provide a manure loader comprising a pivoted mast provided with a boom carrying a pulley over which is adapted to pass a cable which carries a block having a hook to which is connected the eye of a bail between which is pivotally mounted a fork which is locked in an operative position by means of a spring frame whereby the same can be readily released so as to dump its load.

Still another object of our invention is to provide a manure loader which is exceedingly simple and cheap in construction and one which is composed of a very few parts which are so arranged and connected together that any one of the same can be readily replaced if one of them should accidentally become broken.

With these various objects in view, our invention consists in the novel features of construction, arrangement and combination of parts hereinafter described, pointed out in the claims, and shown in the accompanying drawings, in which:

Figure 1 is a side elevation of our improved manure loader. Fig. 2 is a section taken on the line 2—2 of Fig. 1. Fig. 3 is a top plan view of our improved manure loader. Fig. 4 is an enlarged section taken through the winding drum and supporting frame, and Fig. 5 is an enlarged section through our improved fork.

In carrying out our improved invention, we employ a sled A comprising a pair of runners A′ connected together by cross beams $A^2$ and a supporting beam $A^3$ which is connected to one of the end beams $A^2$ by diagonal braces $A^4$ so as to strengthen the same. These beams and braces are preferably connected together by bolts and the ends of the runners A′ are provided with clevises to which chains carrying a doubletree can be readily connected so that a pair of horses can be used for moving the sled from place to place. The supporting beam $A^3$ of the sled is provided with a central bearing in which is mounted the pivoted pin of a mast B which is held in a vertical position by braces C connected to one of the end braces of the sled and having strips C′ carried by their upper ends provided with horizontally apertured end portions adapted to receive a pin D which is pivotally mounted in the upper end of the mast and it will be seen that by this construction the mast is allowed to turn readily and at the same time the mast can be readily removed by detaching the pin.

Extending outwardly from the mast B adjacent its lower end are plates E between which is pivotally mounted a boom F provided with a slot adjacent its upper end in which is mounted a pulley F′ over which passes a cable G which passes over a pulley H mounted in a slot formed in the mast B, said pulley having a pulley H′ arranged above the same for guiding the cable G and the cable then passes downwardly through a pair of plates I secured to the sides of the beam which has a block I′ secured between the same to the mast and carries a cam lever J adapted to engage the cable G and lock the same as will be hereinafter fully described. The cable then passes over a pulley K secured to the beam A³ of the sled and is then passed outwardly through an eye secured to one of the end beams and has a ring G' connected to its end so that a doubletree can be readily connected thereto so that when a pair of horses are attached to the same, the cable will be drawn upwardly as will be hereinafter fully described. The other end of the cable passes over a block L and then upwardly over a block M carried by a hook M' which is connected to an eye N' which is carried by a collar N secured around the upper end of the boom F and the cable then passes outwardly around the block L and is connected to a bail M² of the block M and it will be seen that by this construction the block L will be raised and lowered as the cable G is operated. The collar N carries an eye N² to which is connected a hook O' of a block O over which passes a cable P which has one of its ends connected to a block Q over which the same passes, said block Q having a hook Q' which is adapted to be connected to a link R which is pivotally mounted on the pin D on the top of the mast and it will be seen that when the cable is operated the boom will be raised and lowered. The cable P extends downwardly between a pair of pulleys S mounted in a bracket S' secured to the mast B and has its free end connected to a winding drum T carried by a frame U secured to the mast B and supported in a rigid position by braces U', said winding drum being provided with crank arms T' for operating the same, and it will be seen that by operating the winding drum the boom can be raised and lowered. For locking the winding drum after the cable has been wound thereon, we provide the same with a ratchet wheel V which is adapted to be engaged by a pivoted pawl V' carried by the frame U, and it will be seen that when it is desired to lower the boom after it has been raised, it is only necessary to disengage the pawl V' and the boom will drop by its own weight.

In connection with the above described hoisting mechanism, we employ a fork W which is provided with a transverse shaft W' secured under the teeth of the fork by shoe plates W² which prevent the prongs of the fork from becoming worn and the fork proper is provided with a solid back so that when the manure is gathered upon the same, it will be held thereon. The fork is also provided with rearwardly extending handles W³ so that the same can be guided when being loaded. Pivotally mounted on the ends of the shaft W' are the apertured ends of a bail X which is provided with an eye X' adapted to be connected to the hook L' of the block L and it will be seen that by this arrangement the fork can be readily disconnected when desired. For holding the fork in position to gather a load, we provide the side members of the bail with plates X² having downwardly projecting tongues X³ which are adapted to fit in notches Y' of plates Y carried by a U-shaped frame Y² which is pivotally mounted on the sides of the fork and is normally held up against pins secured to the sides of the fork by a coil spring Y³ which is connected to the back of the fork so that when the fork is loaded and the frame is moved upwardly, the notched plates will be carried downwardly out of engagement with the tongues of the plates carried by the bail whereby the fork will turn over so as to dump its load. By this arrangement, after the fork has been loaded with manure and swung into position to dump its load over a wagon by the boom, it is only necessary to force the frame upwardly and the load will be dumped into the wagon.

From the foregoing description, it will be seen that we have provided a manure loader which is so constructed that manure can be readily loaded from a pile into a wagon and it will also be seen that the device can also be used for gathering manure from a field as by swinging the boom outwardly and drawing the fork in position to gather a load, and then by operating the cable, the fork will be drawn toward the boom so that all manure in advance of the same will be gathered and then by operating the cable so as to raise the boom, the load will be raised in position so that it can be deposited into a wagon.

Having thus fully described our invention, what we claim as new and desire to secure by Letters Patent, is:

1. In a manure loader, the combination with a sled, of a mast pivotally mounted on said sled, braces for supporting said mast, a boom carried by said mast, a cable for raising and lowering said boom, a block and tackle carried by the boom, a fork carried by said block and tackle, and a cam lever for locking the cable of said block and tackle.

2. In a manure loader, the combination with a mast and boom of means for operating the said boom, a block and tackle carried by said boom, a bail carried by said block and tackle, a fork pivotally mounted between said bail provided with handles, and means for locking said fork in an operative position.

3. In a manure loader, the combination with a sled, having a cross beam provided with a bearing, of a mast pivotally mounted in said bearing, braces connecting said mast to said sled, a boom carried by said mast, a winding drum carried by the mast provided with a cable for raising said boom, a block and tackle carried by the boom, a fork carried by said block and tackle, and a cam lever for locking the cable of said block and tackle, for the purpose described.

4. In a manure loader, the combination with a boom carrying a block and tackle, of a bail carried by said block and tackle, a pivoted fork carried by said bail, and means for operating said block and tackle together with means for locking the cable of said block and tackle, whereby said fork can be held in its adjusted position.

JOHN SINNER.
WILLIAM SINZ.

Witnesses:
S. V. WEISER,
L. E. CORRELL.